(12) United States Patent
Landis (10) Patent No.: US 6,978,611 B1
(45) Date of Patent: Dec. 27, 2005

(54) MEMS CLOSED CHAMBER HEAT ENGINE AND ELECTRIC GENERATOR

(75) Inventor: Geoffrey A. Landis, Berea, OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 10/453,251

(22) Filed: Sep. 16, 2003

(51) Int. Cl.$^7$ .............................................. F01B 29/00
(52) U.S. Cl. ............................ 60/513; 60/512; 60/515; 60/508
(58) Field of Search ......................... 60/508, 512, 513, 60/514, 515

(56) References Cited

U.S. PATENT DOCUMENTS

| 3,846,984 | A | * | 11/1974 | Siegel ........................... 60/509 |
| 4,511,805 | A |   | 4/1985  | Boy-Marcotte et al. |
| 4,733,121 | A |   | 3/1988  | Hebert |
| 5,074,114 | A |   | 12/1991 | Meijer et al. |
| 5,367,878 | A | * | 11/1994 | Muntz et al. .................. 60/512 |
| 5,600,190 | A |   | 2/1997  | Zettler |
| 5,932,940 | A |   | 8/1999  | Epstein et al. |
| 6,109,222 | A |   | 8/2000  | Glezer et al. |
| 6,218,762 | B1 |  | 4/2001  | Hill et al. |
| 6,230,566 | B1 | * | 5/2001 | Lee et al. ................. 73/514.32 |
| 6,275,325 | B1 |  | 8/2001  | Sinclair |
| 6,276,313 | B1 |  | 8/2001  | Yang et al. |
| 6,363,712 | B1 |  | 4/2002  | Sniegowski et al. |
| 6,385,973 | B1 | * | 5/2002 | Moran .......................... 60/520 |
| 6,397,793 | B2 |  | 6/2002  | Yang et al. |
| 6,449,406 | B1 |  | 9/2002  | Fan et al. |
| 6,708,945 | B2 | * | 3/2004 | Horiuchi et al. .............. 251/11 |
| 2002/0148237 | A1 | | 10/2002 | Thiesen et al. |

* cited by examiner

Primary Examiner—Hoang Nguyen
(74) Attorney, Agent, or Firm—Howard M. Cohn; Kent N. Stone (57) ABSTRACT

A heat engine, preferably combined with an electric generator, and advantageously implemented using micro-electromechanical system (MEMS) technologies as an array of one or more individual heat engine/generators. The heat engine is based on a closed chamber containing a motive medium, preferably a gas; means for alternately enabling and disabling transfer of thermal energy from a heat source to the motive medium; and at least one movable side of the chamber that moves in response to thermally-induced expansion and contraction of the motive medium, thereby converting thermal energy to oscillating movement. The electrical generator is combined with the heat engine to utilize movement of the movable side to convert mechanical work to electrical energy, preferably using electrostatic interaction in a generator capacitor. Preferably at least one heat transfer side of the chamber is placed alternately into and out of contact with the heat source by a motion capacitor, thereby alternately enabling and disabling conductive transfer of heat to the motive medium.

26 Claims, 7 Drawing Sheets

MEMS CLOSED CHAMBER HEAT ENGINE AND ELECTRIC GENERATOR

The invention described herein was made by an employee of the United States Government and may be manufactured and used by or for the Government for Government purposes without the payment of any royalties thereon or therefore.

TECHNICAL FIELD OF THE INVENTION

The present invention relates to heat engines utilizing a motive medium expanding/contracting in a closed chamber and to said heat engines in combination with electrical generating means, and, more particularly to said engines and generators implemented with micro-electromechanical system (MEMS) technologies.

BACKGROUND OF THE INVENTION

Conversion of heat energy into electrical energy (i.e., a heat engine/generator) is highly desirable for space missions, for example, to convert the heat of radioisotope decay into power for the instruments of spacecraft. It is also desirable for commercial uses, particularly if the conversion devices are small and low cost, and even more so if they can be enabled to work on waste heat from other processes. For space mission applications, it is further desirable that the conversion device be functional in a vacuum ambient environment. In order to take advantage of waste heat, the heat engine/generator should have a good conversion efficiency when utilizing relatively low temperature and relatively small scale heat sources. Furthermore, the device should be mechanically simple and maintenance free to promote reliable long-term operation.

U.S. Pat. No. 4,733,121 (Hebert; 1988), discloses a solid state heat to electricity converter wherein the conversion of heat energy to electric energy is realized by coupling memory materials to piezoelectric materials or to composite magnetoelectric materials and by subsequent hot-cold-strain cycling of the memory material. The embodiment of Hebert's FIG. 1 incorporates memory material in the form of a wire (12) wrapped around an assembly of piezoelectric or magnetoelectric plates (13) such that when the wire (12) is electrically self-heated it contracts, thereby compressing the plates (13) to generate electric output. Hebert's FIG. 3 illustrates a tubular memory material (23) surrounding washers (26) of piezoelectric or magnetoelectric material. Hebert's FIG. 4 illustrates a "bender" wherein a U-shaped foil (31) of memory material is bonded to parallel wafers (28) of piezoelectric or magnetoelectric material. Hebert's FIGS. 5–7 illustrate an embodiment of said benders (36) embedded around a disk (35). The benders can be heated by solar radiation (R) or a combustible gas (G), and cooled by a cold liquid (C) as the disk (35) rotates. A magnet (37) fixed near the station where the benders are heated can provide motive force for a heat engine implementation.

Small scale, low cost devices can be fabricated using micro-electromechanical system (MEMS) technologies. Micro-electromechanical (MEM) devices are formed by well-known semiconductor processing techniques such as etching and photolithography. MEMS can be formed from semiconductor materials, such as single crystal silicon wafers, or from polycrystalline silicon. MEMS fabrication techniques can also be used on other materials, such as silicon carbide or glass. Typical size scales of MEM devices are micrometers to millimeters in scale, with some of the smallest dimensions occasionally less than a micrometer (micron, or $\mu$m) in size. MEM engines are thus much smaller than conventional engines. Because of the small size, many devices can be formed on a single wafer. For example, hundreds or thousands of individual heat engines could be formed on a single thin wafer.

U.S. Pat. No. 6,363,712 (Sniegowski, et al.; 2002), discloses a gas-driven microturbine fabricated by a three-level semiconductor batch-fabrication process based on polysilicon surface-micromachining. This provides a good example of MEMS technology applied to machines with moving parts.

U.S. Pat. No. 6,275,325 (Sinclair; 2001), discloses a thermally activated micro-electromechanical systems (MEMS) actuator having coupled members that undergo different amounts of thermal expansion for moving micromechanical objects, such as a mirror. The actuator members comprise first and second elongate members (224, 226). When current is applied to resistive electrical paths on the actuator members, movement results from thermal expansion that is greater in the second member than in the first member.

Heat engines have long been used to generate electricity, typically by heating/cooling a motive medium (e.g., combustion heating of a gaseous medium), and then using the expanding/contracting motive medium to create mechanical energy by moving mechanical parts (e.g., piston, or turbine) in a heat engine. The mechanical output of the heat engine (e.g., linear movement or rotation) is then coupled to a generator to convert the mechanical energy to electrical energy (e.g., moving wires in a magnetic field, or flexing piezo-electric elements). Many well known types of heat engines utilize internal combustion (e.g., Otto engine or Diesel engine) wherein the motive medium is an air/fuel mixture that is combusted in a chamber. The expanding gases resulting from the combustion are typically used to drive a piston or a turbine. Such engines are relatively complicated, requiring means for mixing fuel and air, and valve means for admitting fuel/air and for exhausting combustion byproducts. Nevertheless, the prior art discloses a number of internal combustion heat engine embodiments fabricated as MEM devices, many of which are then coupled with electric generation means.

U.S. Patent Application Publication 2002/0148237 (Thiesen, et al.; 2002), discloses miniature reciprocating heat pumps and engines, i.e., a miniature thermodynamic device, that can be constructed using standard micro-fabrication techniques (MEMS). An embodiment relates to generation of electrical power wherein a reciprocating piston works against either an electrostatic or a magnetic field. Thiesen's FIGS. 6a–6d illustrate a heat engine/generator operating as a reciprocating internal combustion engine comprised of: piston (10), piston housing (20), metal layers (40, 41) formed on the piston and metal layers (50, 51) formed on the piston housing to provide a capacitor between the piston and the piston housing. Inlet manifolds (221, 224) and inlet valve structures (211, 214) isolate the inlet fluid streams and meter the fuel source. An exhaust manifold (223, 225) and exhaust valve structures (212, 213) allow for the removal of the combustion products. Circuitry for the collection, storage, and distribution of electrical energy generated by the capacitor plates may also be provided, as known in the art. As an alternative to internal combustion, hot gases from external combustion (or any other source of heat that raises the temperature of a gas) may be admitted through the inlet valves for expansion in the chamber against the reciprocating piston.

U.S. Pat. No. 6,109,222 (Glezer, et al.; 2002), discloses miniature reciprocating combustion-driven machinery implemented using micromachining technology wherein a micro heat engine (10) uses a reciprocating free piston (11) driven by a periodic combustion process that alternates combustion between combustors (20, 21) at opposed ends of the piston (11). The combustors comprise suitable means for introducing air and fuel (e.g., valve 25), and means for igniting a combustible mixture (e.g., spark plug 26). As described in column 5, with reference to Glezer's FIGS. 4A and 4B, a preferred embodiment for converting the motion of the piston (11) to electrical energy operates on the principle of magnetic commutation wherein the piston is a rotor of a linear generator and has magnetic regions (32, 33, 34, 35); and the stator (31) comprises permanent magnets (45, 46, 47) alternating with conductor-wound teeth (42, 43, 44) of a back iron (41).

U.S. Pat. No. 6,276,313 (Yang, et al.; 2001), and U.S. Pat. No. 6,397,793 (Yang, et al.; 2002), disclose a microcombustion engine/generator constructed in three layers of micromachined material. The middle layer has two linear free pistons and vents for directing gases and fuels into and out of a central combustion chamber. Electrical energy can be generated by means of permanent magnets (34, 35) in the pistons (21, 22) that move in the fields of electromagnets (36, 37).

The Stirling engine is a well known type of heat engine in which a fixed amount of gas (e.g., hydrogen or helium) is compressed in a cold chamber. The gas is then transferred to a hot chamber, which is heated by an external heat source (typically external combustion), where the gas expands and drives a piston, providing mechanical energy that delivers work. Then the gas is returned to the cold chamber, where it is cooled and the cycle begins again.

Although not implemented in MEMS, an example of a Stirling heat engine/generator is seen in U.S. Pat. No. 4,511,805 (Boy-Marcotte et al.; 1985), that discloses a converter for thermal energy into electrical energy using Stirling motor and integral electrical generator. The machine is completely sealed, having a power piston (15) that drives a linear alternator (20, 21, 22). A displacing piston (7) travels within a cavity (5) causing circulation of the working fluid (e.g., helium) through a circuit (1) that communicates with chambers (5a, 5b) formed on either side of the movable displacing piston (7). The circuit (1) comprises successively: a hot heat exchanger (2), a regenerator (3), and a cold heat exchanger (4).

It is an object of the present invention to provide reliable, maintenance free, low-cost, small scale, heat driven electrical energy generation. It is a further object to meet the objectives with a simple heat engine that does not require the complexities of prior art engine/generators with fluid control valves and complex moving parts subject to wear and breakdown. Further objects include utilization of various types of waste heat, and the ability to function in a vacuum.

BRIEF SUMMARY OF THE INVENTION

According to the invention, a heat engine for converting thermal energy to mechanical work comprises: a closed chamber containing a motive medium; means for alternately enabling and disabling transfer of thermal energy from a heat source to the motive medium; and at least one movable side of the chamber that moves in response to thermally-induced volumetric changes in the motive medium.

According to the invention, the heat engine further comprises means for placing at least one heat transfer side of the chamber alternately into and out of contact with the heat source, thereby alternately enabling and disabling conductive transfer of thermal energy from the heat source to the motive medium. Preferably, the at least one heat transfer side is a diaphragm that flexes under control of the placing means. Alternately, the at least one heat transfer side and at least a surface of the heat source are matingly corrugated. Preferably, the placing means comprise: a motion capacitor having a chamber plate mounted on the at least one heat transfer side of the chamber; and a base plate mounted on the heat source. Preferably, the heat engine further comprises: an electrically non-conductive and thermally low-emissivity coating on at least one of the base plate and the chamber plate of the motion capacitor; a thermally low-emissivity coating on a surface of the base that faces the chamber; and a thermally low-emissivity coating on a surface of the chamber that faces the base.

According to the invention, the heat engine further comprises: the at least one movable side being a diaphragm that flexes in response to thermally-induced volumetric changes in the motive medium.

According to the invention, the heat engine further comprises: electrical generation means that utilize the movement of the movable side, preferably wherein the electrical generation means comprise a generator capacitor having a moving plate on the movable side that moves relative to a fixed plate; and wherein the generator capacitor fixed plate is mounted on a structure that is adapted to shed heat.

According to the invention, the heat engine is preferably implemented with micro-electromechanical system (MEMS) technologies; and the heat engine comprises one or more individual heat engines implemented in an array.

According to the invention, the motive medium of the heat engine is preferably a gas.

According to the invention, the heat engine further comprises one or more surfaces of the chamber that are adapted to shed heat.

According to the invention, a method for converting heat into linear oscillatory motion, comprises the steps of: containing a motive medium in a closed chamber having at least one movable side that moves in response to thermally-induced volumetric changes in the motive medium; and alternately enabling and disabling transfer of thermal energy from a heat source to the motive medium.

According to the invention, the method further comprises the step of placing at least one heat transfer side of the chamber alternately into and out of contact with the heat source. Preferably, the method further comprises the steps of: placing at least one heat transfer side of the chamber by flexing the at least one heat transfer side as a diaphragm; enhancing heat transfer by matingly corrugating the at least one heat transfer side and at least a surface of the heat source; and utilizing a placing means comprising a motion capacitor having a chamber plate mounted on the at least one heat transfer side of the chamber; and a base plate mounted on the heat source. Preferably, the method further comprises the step of using a gas for the motive medium.

According to the invention, a micro-electromechanical system (MEMS) electric generator driven by heat, comprises a heat engine for converting thermal energy to mechanical work, the heat engine comprising: a closed chamber containing a motive medium, means for alternately enabling and disabling transfer of thermal energy from a heat source to the motive medium, and at least one movable side of the chamber that moves in response to thermally-induced volumetric changes in the motive medium; and the MEMS electric generator further comprising: electrical generation means combined with the heat engine to utilize movement of the movable side to convert mechanical work to electrical energy; and implementation of the combined heat engine and electrical generation means using MEMS technologies to create a MEMS heat engine/generator; wherein the MEMS heat engine/generator comprises one or more individual heat engines implemented in an array.

According to the invention, the MEMS electric generator further comprises: means for placing at least one heat transfer side of the chamber alternately into and out of contact with the heat source, thereby alternately enabling and disabling conductive transfer of thermal energy from the heat source to the motive medium; preferably wherein: the at least one heat transfer side is a diaphragm that flexes under control of the placing means; and preferably wherein the placing means comprise: a motion capacitor having a chamber plate mounted on the at least one heat transfer side of the chamber; and a base plate mounted on the heat source.

According to the invention, the MEMS electric generator further comprises: the at least one movable side being a diaphragm that flexes in response to thermally-induced volumetric changes in the motive medium.

According to the invention, the MEMS electric generator further comprises electrical generation means comprising a generator capacitor having a moving plate on the movable side that moves relative to a fixed plate.

According to the invention, the MEMS electric generator further comprises the motive medium being a gas.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199*a*, 199*b*, 199*c*, etc. Or, related but modified elements may have the same number but are distinguished by primes. For example, 109, 109', and 109" are three different elements which are similar or related in some way, but have significant modifications, e.g., a tire 109 having a static imbalance versus a different tire 109' of the same design, but having a couple imbalance. Such relationships, if any, between similar elements in the same or different figures will become apparent throughout the specification, including, if applicable, in the claims and abstract.

The structure, operation, and advantages of the present preferred embodiment of the invention will become further apparent upon consideration of the following description taken in conjunction with the accompanying drawings, wherein.

DETAILED DESCRIPTION OF THE INVENTION

The present invention concerns a novel form of heat engine. In the preferred embodiments described herein, the heat engine is implemented using micro-electromechanical system (MEMS) technologies (also known as micromachining), and the heat engine is coupled with electrical generation means to form a MEMS heat engine and electric generator suitable for converting heat energy (e.g., waste heat) into electrical power. In a MEMS embodiment, the inventive heat engine (with or without electric generating means) is preferably implemented as a planar array of many miniaturized individual heat engines. For example, using common MEMS techniques and size scales, hundreds or even many thousands of individual heat engines could be formed on a single six-inch round silicon wafer.

Figure 1:
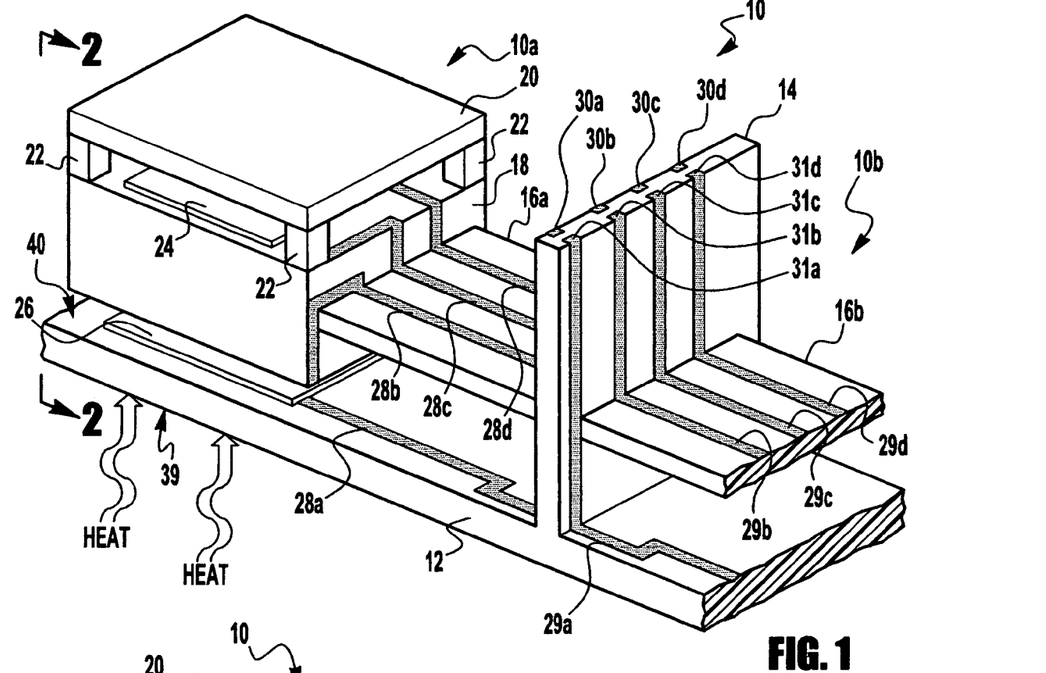
FIG. 1 is a perspective view of a portion of an array of individual heat engine/generators comprising an first embodiment of a heat engine/generator according to the invention.

FIG. 1 illustrates a first preferred embodiment of the invention. A heat engine/generator 10 comprises a planar array of one or more individual heat engine/generators 10a (shown complete) and 10b (shown only partially), that are built upon a base 12. A first side (illustrated as a bottom side 39) of the base 12 is adapted to be in thermal contact with a source of heat (HEAT) such that heat is conducted into and through the base 12 to a second side (illustrated as a top side 40), thereby making the base 12 a heat source for the heat engine/generator 10. The planar array of one or more individual heat engine/generators 10a, 10b (collectively referred to as 10) is fabricated upon the base 12. Many more individual heat engine/generators 10 (not shown) can be included in the planar array that extends in all horizontal directions of a plane defined by the base 12. It is within the scope of the invention for the heat engine/generator 10 to comprise any number of individual heat engine/generators 10a, 10b, including only a single individual heat engine/generator (e.g., 10a), and furthermore, the array of individual heat engine/generators 10a, 10b may be adapted to conform to the size and shape of a source of heat (HEAT), and therefore need not be planar.

For convenience in the following description, the heat engine/generator(s) 10 may be referred to by the abbreviated term: "generator 10". References in the description to top, bottom, up, down, etc. are to be understood as relating to directions as illustrated in the figures. The invention is not limited to orientations as illustrated, because operation of the heat engine depends on thermal conduction in solids, on pressure-volume changes in a motive medium resulting from conductive heating/cooling, and possibly on radiative cooling—all phenomena that operate substantially without reference to a gravitational field. Convective cooling can be used, but is not essential to the operation of the invention which is designed to function in space conditions of vacuum and/or insignificant gravity. Indeed, one of the advantages of the invention is its ability to function in both space and in planetary ambient environments. Of course, given the teachings of the present disclosure, those skilled in the relevant arts may note various means to optimize the operation of the inventive heat engine/generator 10 for primary use in a single one of the possible environments.

Figure 2A:
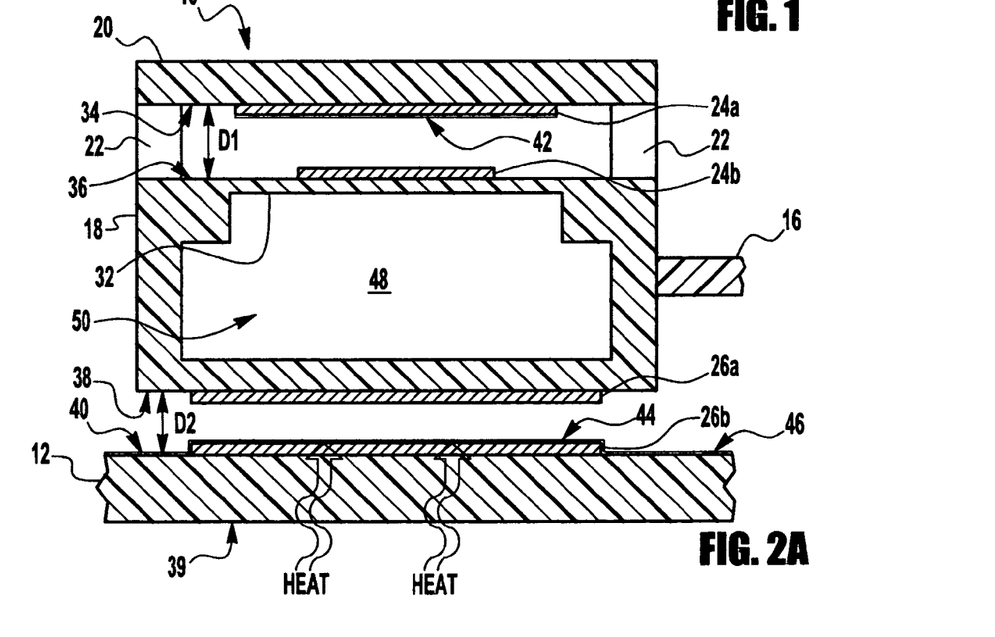
FIG. 2A is a cross-sectional view of a portion of the heat engine/generator of FIG. 1, the cross-section taken along the line 2—2 in FIG. 1, illustrating an exemplary stage in an operational cycle of the heat engine/generator according to the invention.

The generator 10 comprises a closed (sealed) chamber 18 that is connected to a post 14 by means of an arm 16. The post 14 is built up on the base 12, and is advantageously a relatively thin vertical wall that divides two rows of individual beat engine/generators (e.g., 10a, 10b) such that the two rows are mirrored across the wall (post) 14. A cap 20 is mounted on standoffs 22 above the chamber 18, and a generator capacitor 24 is mounted between the cap 20 and the chamber 18. In an unstressed, at-rest condition the arm 16 is positioned such that the chamber 18 is spaced away from the base 12, and a motion capacitor 26 is mounted between the chamber 18 and the base 12. Suitable electrical connections are provided by means of traces 28a–28d (collectively referred to as 28), 29a–29d (collectively referred to as 29) and connection pads 30a–30d (collectively referred to as 30), 31a–31d (collectively referred to as 31). For example, traces 28a and 28b electrically connect two plates of the motion capacitor 26 (plates 26b and 26a, respectfully, as seen in FIG. 2A) to the connection pads 30a and 30b, respectfully. For example, traces 28c and 28d electrically connect two plates of the generator capacitor 24 (plates 24a and 24b, respectfully, as seen in FIG. 2A) to the connection pads 30c and 30d, respectfully. It may be noted that the portion of the trace 28c that is laid on the back side of the standoff 22 and on the underside of the cap 20 is not visible in FIG. 1. The connection pads 30, 31 provide means for connecting the generators 10 to a control circuit that will be described hereinbelow.

Using known MEMS techniques, the herein-described generator 10 embodiments can be formed, for example, from a single crystal silicon wafer by the techniques of photolithography and etching. Several layers of wafer may have to be used. Examples of other possible MEMS fabrication materials are: polycrystalline silicon, silicon carbide, and glass. The capacitor plates 24a, 24b, 26a, 26b and the electrical connections 28, 29, 30, 31 can be produced by deposition of thin layers of metal defined by photolithography.

FIGS. 2A–2D show a cross-sectional view of a heat engine/generator 10, illustrating exemplary stages in an operational cycle. Further construction details are revealed in the cross-sectional view, taken along the line 2—2 of FIG. 1. Referring first to FIG. 2A, which shows the generator 10 in the same unstressed, at-rest operational stage and position as FIG. 1, it can be seen that a bottom surface 34 of the cap 20 is spaced apart from a top surface 36 of the chamber 18 by a distance "D1". Preferably, the surfaces 34, 36 are substantially parallel to each other. A fixed plate 24a of the generator capacitor 24 is deposited on the cap bottom surface 34, and an opposed moving plate 24b of the generator capacitor 24 is deposited on the chamber top surface 36, positioned substantially over the diaphragm 32. Since the generator capacitor plates 24a, 24b are very thin, the distance D1 is approximately equal to a generator capacitor plate spacing when the generator 10 is in the unstressed, at-rest operational stage as illustrated in FIGS. 1 and 2A. For reasons to be discussed hereinbelow, an electrically non-conductive (insulating) coating 42 is optionally deposited on at least one of the plates 24a, 24b of the generator capacitor 24, e.g., on the generator capacitor fixed plate 24a.

A bottom surface 38 of the chamber 18 is spaced apart from a top surface 40 of the base 12 by a distance "D2". Preferably, the surfaces 38, 40 are substantially parallel to each other. A chamber plate 26a of the motion capacitor 26 is deposited on the chamber bottom surface 38, and an opposed base plate 26b of the motion capacitor 26 is deposited on the base top surface 40. Since the motion capacitor plates 26a, 26b are very thin, the distance D2 is approximately equal to a motion capacitor plate spacing. For reasons to be discussed hereinbelow, an electrically non-conductive (insulating), and thermally low-emissivity coating 44 is optionally deposited on at least one of the plates 26a, 26b of the motion capacitor 26 (e.g., on base plate 26b), and a thermally low-emissivity coating 46 is optionally deposited on the remainder of the base top surface 40. It is within the scope of the invention for the coating 44 to be deposited over the motion capacitor base plate 26b in a continuous coat of the entire top surface 40 of the base 12. It is also within the scope of the invention to use the electrically non-conductive and thermally low-emissivity coating 44 as the coating 46 to be deposited in a continuous coat of the entire top surface 40 of the base 12 as well as over the motion capacitor base plate 26b. It is also within the scope of the invention to use the same coating material to form all of the coatings 42, 44, and 46.

It is desirable for the capacitor plate coatings 42 and 44 to be non-adhering in order to prevent capacitor plates 24a, 24b, 26a, 26b from sticking together whenever they contact each other. Examples of suitable electrically low-conductivity, thermally low-emissivity, and non-adhering coating materials include thin oxides of silicon, titanium, or tantalum, as well as silicon nitride, or a thin coating of diamond-like carbon.

In the preferred embodiment illustrated in FIGS. 2A–2D, the chamber 18 is a closed chamber having a sealed enclosed volume 48 that is filled with a gas 50 that comprises a motive medium for the heat engine. It is within the scope of the invention for the motive medium to be any phase (e.g., gaseous, liquid or solid) of a material having a suitable thermal expansion coefficient. An important feature of the present invention is that the enclosed volume (e.g., 48) comprises a closed chamber (e.g., 18), i.e., the chamber's enclosed volume (e.g., 48) is sealed in a way that prevents circulation of the motive medium (e.g., gas 50) out of, or into the bounds of the enclosed volume. The top side of the chamber 18 is formed as a diaphragm 32, being sufficiently thinner and more flexible than the other sides of the chamber 18 so as to preferentially flex in response to pressure changes of the gas 50. For example, increased pressure of the gas 50 will cause the diaphragm 32 to flex upward, thereby allowing the volume to increase in the enclosed volume 48, whereas the other, non-diaphragm sides of the chamber 18 will not substantially flex since they are significantly thicker and less flexible than the diaphragm 32.

With reference to FIGS. 2A–2D, an operational cycle of the heat engine/generator 10 will now be described.

FIG. 2A shows the generator 10 at-rest with the arm 16 and the diaphragm 32 in at-rest, unstressed positions (comparable to FIG. 1). The bottom side 39 of the base 12 is in thermal contact with a heat source (HEAT) such that heat is conducted through the base 12 to the top side 40 and into the motion capacitor base plate 26b as illustrated by the representative HEAT lines. The coatings 44,46 are preferably of a low thermal emissivity so as to reduce thermal radiation, therefore only small amounts of heat are transferred to the chamber 18. If the low-emissivity coating 44 is optionally applied to cover the motion capacitor chamber plate 26a and/or other outside surfaces (e.g., bottom surface 38) of the chamber 18, then absorption of any thermal radiation would be further diminished for the chamber 18 (absorptivity being approximately equal to emissivity).

Figure 2B:
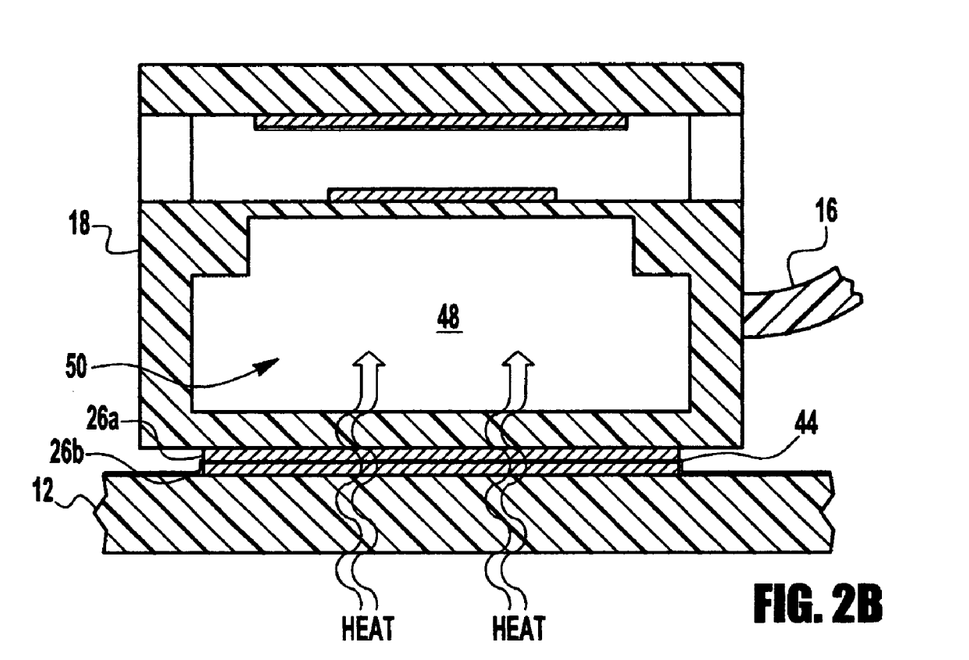
FIG. 2B is a cross-sectional view of a portion of the heat engine/generator of FIG. 1, the cross-section taken along the line 2—2 in FIG. 1, illustrating an exemplary operational cycle stage following the stage of FIG. 2A according to the invention.

Referring now to FIG. 2B, the chamber 18 has been pulled down to be in thermal contact with the base 12 via the motion capacitor plates 26a, 26b, by applying opposite electrostatic charges to the motion capacitor plates 26a, 26b. The use of electrostatic force between capacitor plates to provide motion is well known in the MEMS art. The arm 16, fabricated in silicon, for example, is flexible and functions as a perfect spring in the MEM scale. The electrically non-conductive, low-emissivity coating 44 on the motion capacitor 26 prevents neutralization of the opposing charges when the motion capacitor chamber plate 26a is pulled into thermal contact with the motion capacitor base plate 26b. However, the coating 44 has reasonably good thermal conductivity, as do the materials in the base 12, the motion capacitor 26, and the chamber 18, therefore the heat in the base 12 is conducted into the enclosed volume 48 where it can heat the gas 50 by conduction and convection.

Figure 2C:
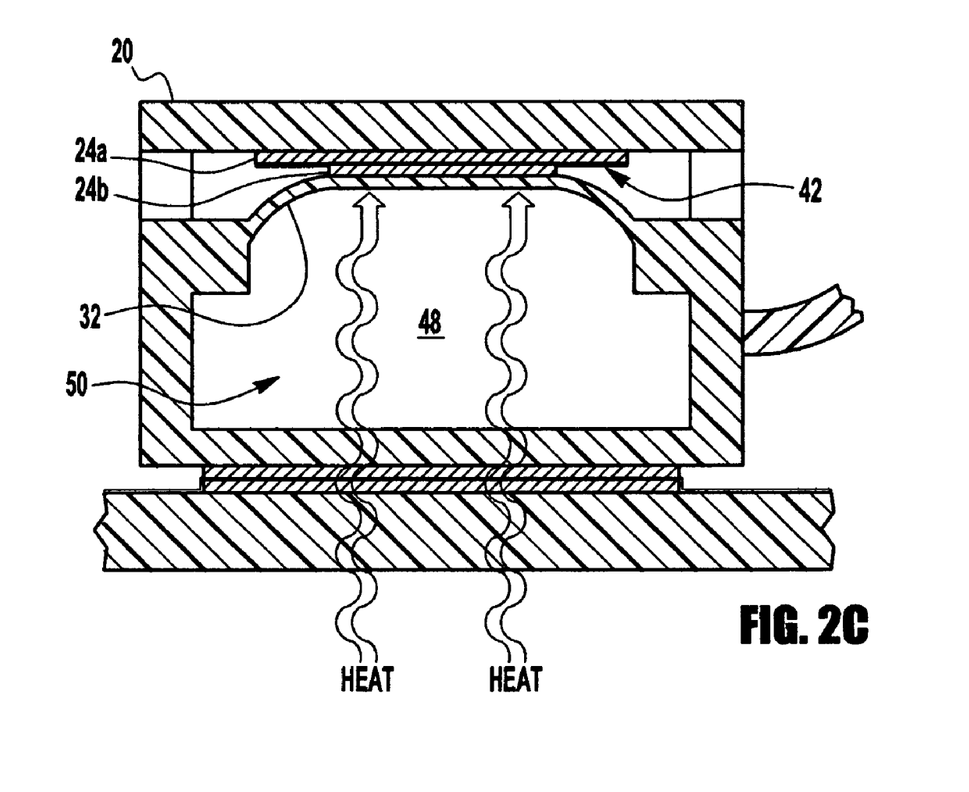
FIG. 2C is a cross-sectional view of a portion of the heat engine/generator of FIG. 1, the cross-section taken along the line 2—2 in FIG. 1, illustrating an exemplary operational cycle stage following the stage of FIG. 2B according to the invention.

Referring now to FIG. 2C, the gas 50 has been heated sufficiently to cause enough gas pressure to expand the enclosed volume 48 by flexing the diaphragm 32 upward to press against the cap 20 via the generator capacitor plates 24a, 24b. The diaphragm 32, fabricated in silicon, for example, is flexible and functions as a perfect spring in the MEM scale. The electrically non-conductive coating 42 on the generator capacitor 24 prevents electrical short-circuiting if/when the diaphragm 32 presses the generator capacitor moving plate 24b against the generator capacitor fixed plate 24a. By causing the generator capacitor plates 24a, 24b to be charged alike, when the flexing diaphragm 32 moves the generator capacitor moving plate 24b toward the generator capacitor fixed plate 24a, this motion pushes against electrostatic force tending to repel the equally charged generator capacitor plates 24a, 24b, and hence does work, which generates energy in the form of electrical energy.

Figure 2D:
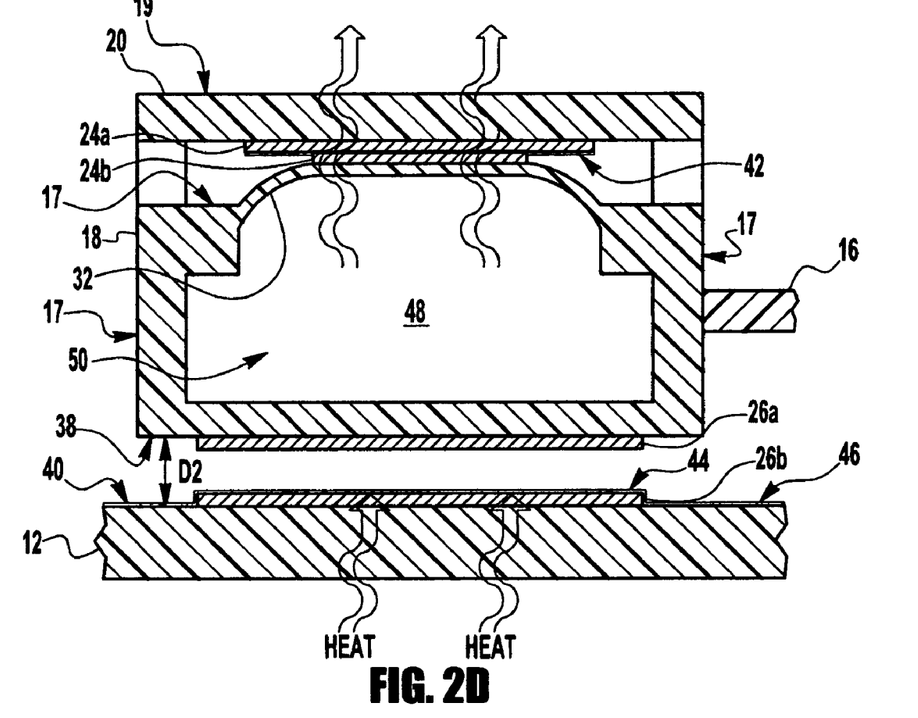
FIG. 2D is a cross-sectional view of a portion of the heat engine/generator of FIG. 1, the cross-section taken along the line 2—2 in FIG. 1, illustrating an exemplary operational cycle stage following the stage of FIG. 2C, and generally preceding the stage of FIG. 2A according to the invention.

Referring now to FIG. 2D, the chamber 18 has been pushed upward out of thermal contact with the base 12, preferably by neutralizing the electrostatically attractive charging of the motion capacitor plates 26a, 26b and allowing spring force in the arm 16 to re-straighten the arm 16 thereby returning the chamber 18 to a position where the bottom surface 38 of the chamber 18 is spaced apart from the top surface 40 of the base 12 by the distance D2. Optionally, a like charge is applied to both of the motion capacitor plates 26a, 26b, thereby electrostatically repelling them apart, optionally further repelling the chamber 18 to a position higher than shown such that the arm 16 is bent upwards and the bottom surface 38 is spaced apart from the top surface 40 by a distance greater than the distance D2. With the chamber 18 no longer in thermal contact with the heated base 12, heat is no longer being transferred into the enclosed volume 48. Therefore the balance of energy transfer for the gas 50 in the chamber 18 becomes predominantly heat loss, i.e., cooling of the gas 50. As shown in FIG. 2D, while thermal contact is maintained between the diaphragm 32 and the cap 20, heat is conducted through the diaphragm 32, the generator capacitor plates 24a, 24b, the coating 42, and the cap 20. The top 19 of the cap 20 is adapted to shed heat (thermal energy) using whatever means is appropriate to the ambient conditions, e.g., high emissivity to enhance radiation cooling, or heat sink fins for convection cooling. In another example, a heat sink (not shown) could be fixed above the cap 20 such that the top surface 19 would come into thermal contact with the heat sink (enabling conductive cooling) whenever the chamber is pushed upward as shown in FIG. 2D. To further enable cooling of the chamber 18, one or more outside surfaces 17 of the chamber 18 are optionally adapted to shed heat using appropriate means.

The chamber 18 has been described as being sealed to prevent substantial leakage of the motive medium (e.g., gas 50). For the case of such an engine operating in atmosphere, the motive medium (gas 50) could be atmospheric air. In this case, it is necessary only that the seal be sufficient to prevent substantial leakage of the air into or out of the chamber in the time scale of the engine cycle. Slow exchange of the chamber contents with the atmosphere, over time scales long compared to the engine cycle, will not affect the operation.

As the gas 50 cools, it will lose pressure, eventually allowing spring force in the diaphragm 32 to un-flex the diaphragm 32 downward to its at-rest position as illustrated in FIG. 2A, thereby reducing the volume of the enclosed volume 48, i.e., contracting the gas 50. By causing the generator capacitor plates 24a, 24b to be oppositely charged while the gas 50 is cooling, when the un-flexing diaphragm 32 moves the generator capacitor moving plate 24b away from the generator capacitor fixed plate 24a, this motion pulls against electrostatic force tending to mutually attract the oppositely charged generator capacitor plates 24a, 24b, and hence does work, which again generates energy in the form of electrical energy.

Thus it can be seen that a complete operational cycle for the heat engine/generator 10 is illustrated by the sequence of drawings in FIGS. 2A, then 2B, then 2C, then 2D, and finally back to 2A.

Figure 3:
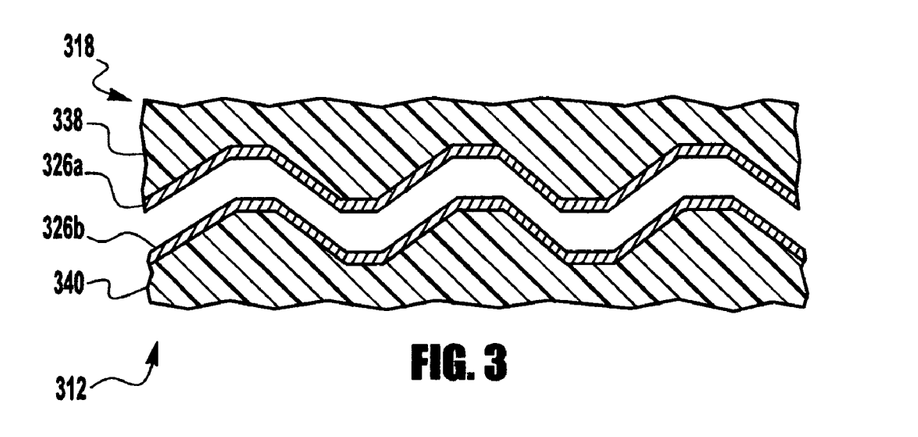
FIG. 3 is a cross-sectional view of an alternate embodiment of a motion capacitor portion of the heat engine/generator of FIG. 1, according to the invention.

FIG. 3 illustrates an alternate embodiment of the motion capacitor 26, wherein the thermal contact area between base 312 (compare 12) and chamber 318 (compare 18) is increased by providing a corrugated structure. A motion capacitor chamber plate 326a (compare 26a) is formed on a corrugated chamber bottom surface 338 (compare 38), and a motion capacitor base plate 326b (compare 26b) is formed on a matingly corrugated base top surface 340 (compare 40). For example, the corrugated chamber bottom surface 338 comprises a regular array of truncated pyramidal peaks, while the corrugated base top surface 340 comprises a regular array of matingly corresponding truncated pyramidal pits.

Figure 6:
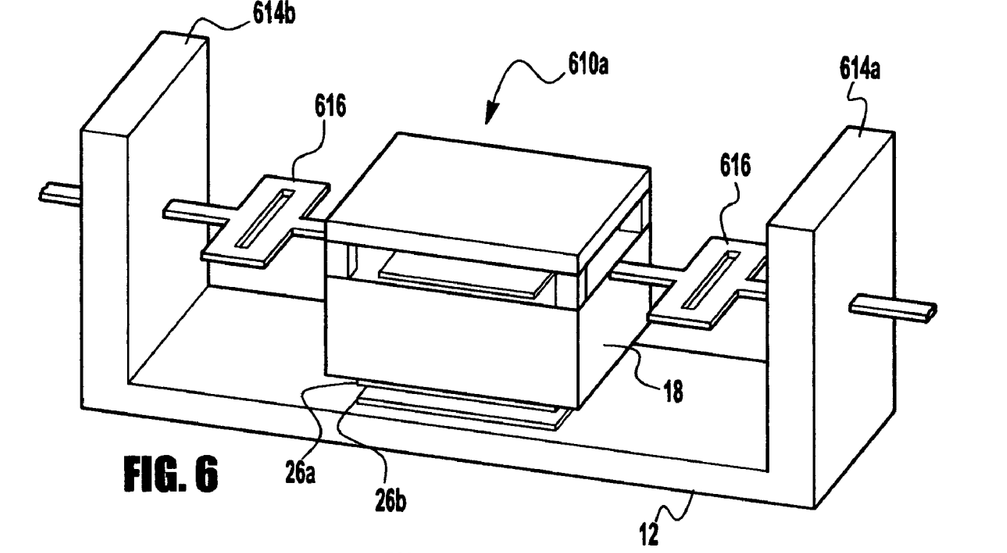
FIG. 6 is perspective view of a portion of an array of individual heat engine/generators comprising a variation of the first embodiment of a heat engine/generator having an alternate arm according to the invention.
Figure 7A:
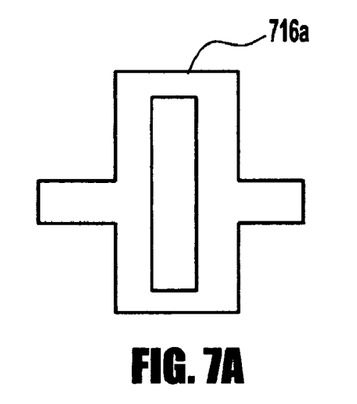
FIGS. 7A through 7D are top views of four examples of shapes for the alternate arm of FIG. 6 according to the invention.
Figure 7B:
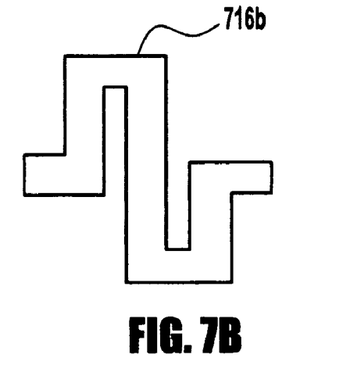
Figure 7C:
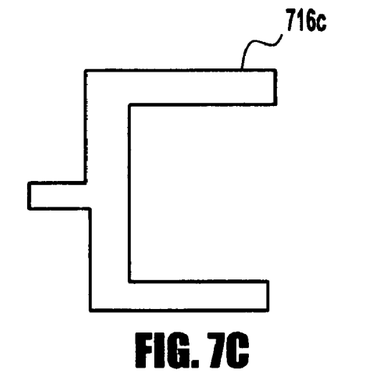
Figure 7D:
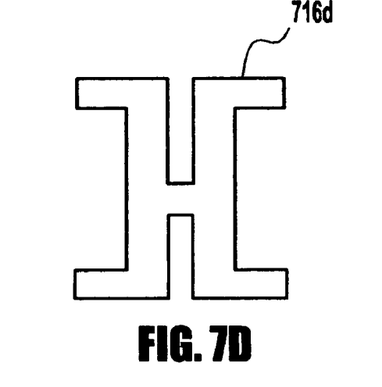

FIG. 6 illustrates the use of an alternative form of arm 616 (compare arm 16) with the first embodiment of heat engine/generator 10a of FIG. 1, thereby forming a variant heat engine/generator 610a. The alternate arm 616 is shaped such that it is stretchable in addition to being bend-flexible. As for the arm 16, the alternate arm 616 is planar in order to establish a preferred bending direction that is normal to the base 12. It should be apparent that a multitude of shapes will satisfy these criteria for the alternate arm 616; FIGS. 7A–7D illustrate top views of a few examples of suitably shaped alternate arms 716a, 716b, 716c, 716d (noting that 716a illustrates the shape of the alternate arm 616 shown in FIG. 6). By attaching alternate arms 616 on opposed sides of the chamber 18, the chamber 18 readily maintains a parallel alignment of the motion capacitor plates 26a, 26b as the chamber 18 is moved up and down by the motion capacitor plates 26a, 26b. In the embodiment illustrated in FIG. 6, two alternate arms 616 are used. One alternate arm 616 is attached between a first side of the chamber 18 and a first post 614a (compare 14), and a second alternate arm 616 is attached between a second side of the chamber 18 (opposite to the first side of the chamber 18) and a second post 614b. A further alternate embodiment (not illustrated) has additional posts (e.g., 614a) on the remaining two sides of the chamber 18 and another two alternate arms 616 attached between the additional posts and the remaining two sides of the chamber 18. Other than the arms 616 and the posts 614a, 614b (and optional additional posts), the variant heat engine/generator 610a is structurally equivalent to the first embodiment of heat engine/generator 10a that is illustrated in FIG. 1. Various features, e.g., the traces 28a–28d should be assumed present even though they are not illustrated in FIG. 6 for the sake of illustrative simplicity.

FIGS. 4A–4D show a cross-sectional view of an alternate embodiment of a heat engine/generator 410 (generator 410), illustrating exemplary stages in an operational cycle. By comparing the drawing of FIG. 4A to that of FIG. 2A, it can be determined that the alternate embodiment generator 410 has a stationary chamber 418 whereas the preferred embodiment generator 10 has a moving chamber 18. The stationary chamber generator 410 is a MEMS fabrication having many of the same elements as the moving chamber generator 10, therefore the duplicate elements in FIGS. 4A–4D have the same reference numbers as the corresponding elements in FIGS. 1–2D that are duplicated. Furthermore, the stationary chamber generator 410 is advantageously fabricated as a planar array of one or more individual stationary chamber heat engine/generators 410, comparable to the array of generators 10 that is partially illustrated in FIG. 1. Suitable electrical connections comparable to the traces 28, 29 and connection pads 30, 31 can be provided, optionally on posts 14, according to well known MEMS design techniques. Those elements of the stationary chamber generator 410 that differ from already-described elements of the moving chamber generator 10 will now be described.

Figure 4A:
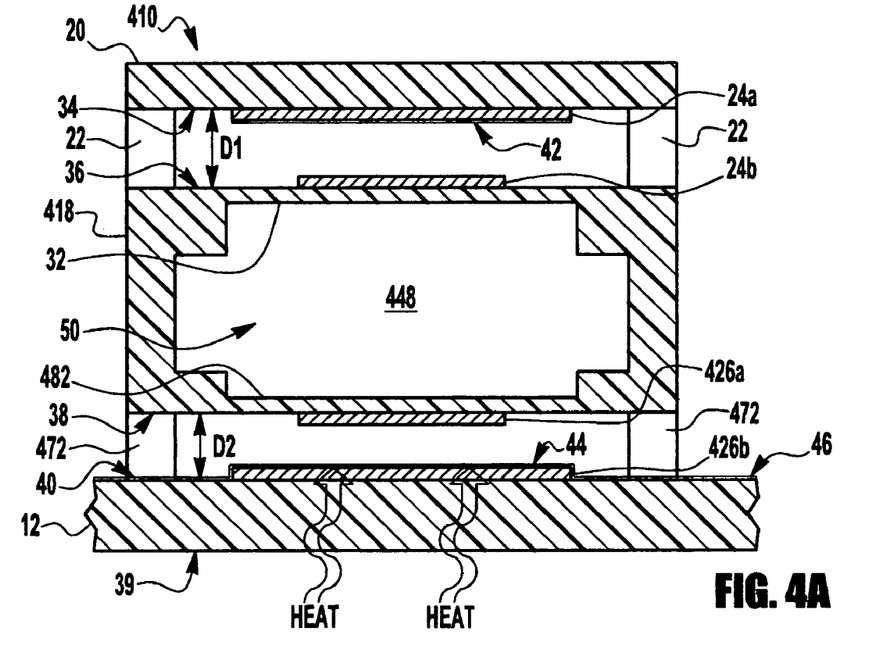
FIG. 4A is a cross-sectional view of a portion of a second embodiment of a heat engine/generator, the cross-section taken along a line comparable to the line 2—2 in FIG. 1, illustrating an exemplary stage in an operational cycle of the second embodiment heat engine/generator according to the invention.

Referring to FIG. 4A, which shows the stationary chamber generator 410 in an unstressed, at-rest operational stage, the stationary chamber 418 (compare 18) is a closed chamber having a sealed enclosed volume 448 (compare 48) that is filled with a gas 50 that comprises a motive medium for the heat engine. The top side of the stationary chamber 418 is formed as the diaphragm 32, and the bottom side of the chamber 418 is formed as a motion diaphragm 482, such that both diaphragms 32, 482 are thinner and more flexible than the other sides of the stationary chamber 418. Instead of a flexible arm (e.g., arm 16), a set of chamber standoffs 472 (e.g., one in each corner of the chamber bottom surface 38) supports the stationary chamber 418 above the base 12 at a distance "D3". Preferably, the surfaces 38, 40 are substantially parallel to each other. A chamber plate 426a (compare 26a) of the motion capacitor 426 is deposited on the stationary chamber bottom surface 38, positioned substantially over the motion diaphragm 482, and an opposed base plate 426b (compare 26b) of the motion capacitor 426 is deposited on the base top surface 40. Since the motion capacitor plates 426a, 426b are very thin, the distance D3 is approximately equal to a motion capacitor plate spacing.

With reference to FIGS. 4A–4D, an operational cycle of the stationary chamber, alternate embodiment heat engine/generator 410 will now be described.

FIG. 4A shows the stationary chamber generator 410 at-rest with the diaphragm 32 and the motion diaphragm 482 in at-rest, unstressed positions (comparable to FIG. 2A). The bottom side 39 of the base 12 is in thermal contact with a heat source (HEAT) such that heat is conducted through the base 12 to the top side 40 and into the motion capacitor base plate 426b as illustrated by the representative HEAT lines. The low-emissivity coatings 44, 46 prevent significant thermal radiation, therefore the heat is not transferred to the stationary chamber 418. If the low-emissivity coating 44 is optionally applied to cover the motion capacitor chamber plate 426a and/or other outside surfaces (e.g., bottom surface 38) of the stationary chamber 418, then absorption of any thermal radiation would be further diminished for the stationary chamber 418 (absorptivity being approximately equal to emissivity).

Figure 4B:
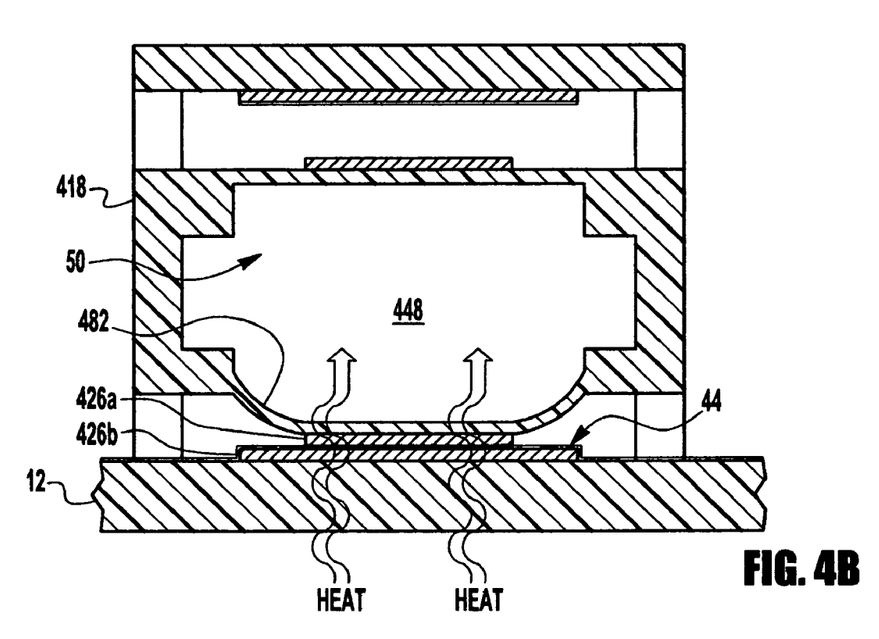
FIG. 4B is a cross-sectional view of a portion of a second embodiment of a heat engine/generator, the cross-section taken along a line comparable to the line 2—2 in FIG. 1, illustrating an exemplary operational cycle stage following the stage of FIG. 4A according to the invention.

Referring now to FIG. 4B, the motion diaphragm 482 has been pulled down to be in thermal contact with the base 12 via the motion capacitor plates 426a, 426b, by applying opposite electrostatic charges to the motion capacitor plates 426a, 426b. The motion diaphragm 482, fabricated in silicon, for example, is flexible and functions as a perfect spring in the MEM scale. The electrically non-conductive, low-emissivity coating 44 on the motion capacitor 426 prevents neutralization of the opposing charges when the motion capacitor chamber plate 426a is pulled into thermal contact with the motion capacitor base plate 426b. However, the coating 44 has reasonably good thermal conductivity, as do the materials in the base 12, the motion capacitor 426, and the stationary chamber 418, therefore the heat in the base 12 is conducted into the stationary chamber enclosed volume 448 where it can heat the gas 50 by conduction and convection.

Figure 4C:
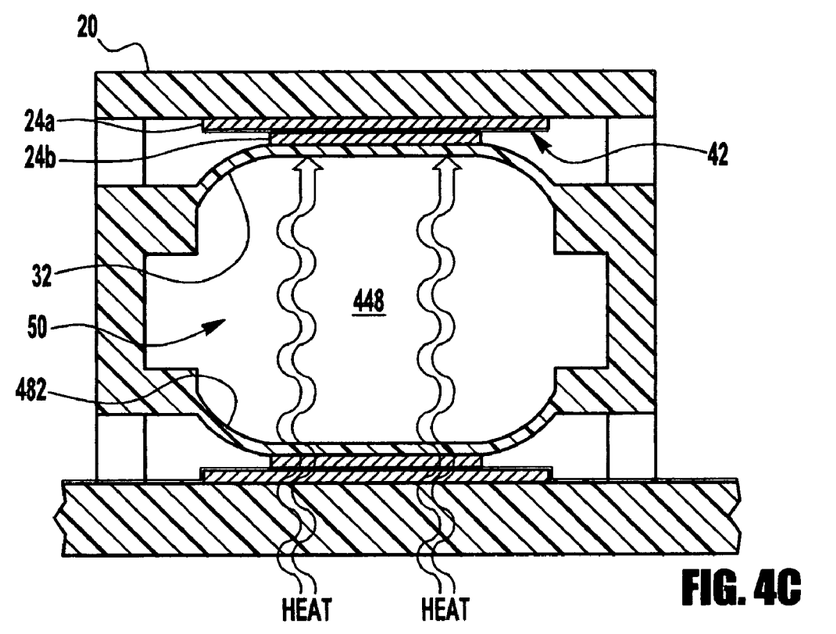
FIG. 4C is a cross-sectional view of a portion of a second embodiment of a heat engine/generator, the cross-section taken along a line comparable to the line 2—2 in FIG. 1, illustrating an exemplary operational cycle stage following the stage of FIG. 4B according to the invention.

Referring now to FIG. 4C, the gas 50 has been heated sufficiently to cause enough gas pressure to expand the stationary chamber enclosed volume 448 by flexing the diaphragm 32 upward to press against the cap 20 via the generator capacitor plates 24a, 24b. The diaphragm 32, fabricated in silicon, for example, is flexible and functions as a perfect spring in the MEM scale. The electrically non-conductive coating 42 on the generator capacitor 24 prevents electrical short-circuiting if/when the diaphragm 32 presses the generator capacitor moving plate 24b against the generator capacitor fixed plate 24a. By causing the generator capacitor plates 24a, 24b to be charged alike, when the flexing diaphragm 32 moves the moving plate 24b toward the fixed plate 24a, this motion pushes against electrostatic force tending to repel the equally charged generator capacitor plates 24a, 24b and hence does work, which generates energy in the form of electrical energy.

Figure 4D:
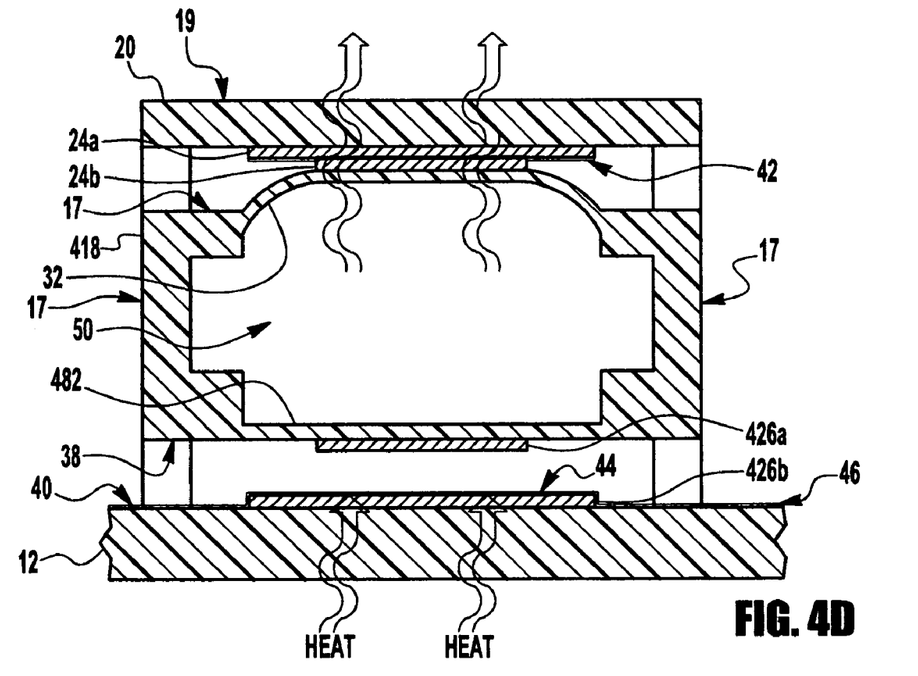
FIG. 4D is a cross-sectional view of a portion of a second embodiment of a heat engine/generator, the cross-section taken along a line comparable to the line 2—2 in FIG. 1, illustrating an exemplary operational cycle stage following the stage of FIG. 4C, and generally preceding the stage of FIG. 4A according to the invention.

Referring now to FIG. 4D, the motion diaphragm 482 has been pushed upward out of thermal contact with the base 12, preferably by neutralizing the electrostatically attractive charging of the motion capacitor plates 426a, 426b and allowing spring force in the motion diaphragm 482 to un-flex the motion diaphragm 482 thereby returning the bottom surface 38 of the stationary chamber 418 to be spaced apart from the top surface 40 of the base 12 by the distance D3. Since the gas 50 is presently at an elevated pressure, upward motion of the motion diaphragm 482 is preferably assisted by applying a like charge to both of the motion capacitor plates 426a, 426b, thereby electrostatically repelling them apart. Depending on the timing of the like-charge application, this electrostatic propulsion upward of the motion diaphragm 482 can be used to push the diaphragm 32 further upward. With the stationary chamber 418 no longer in thermal contact with the heated base 12, heat is no longer being transferred into the stationary chamber enclosed volume 448. Therefore the balance of energy transfer for the gas 50 in the stationary chamber 418 becomes predominantly heat loss, i.e., cooling of the gas 50. As shown in FIG. 4D, while thermal contact is maintained between the diaphragm 32 and the cap 20, heat is conducted through the diaphragm 32, the generator capacitor plates 24a, 24b, the coating 42, and the cap 20. The top 19 of the cap 20 is adapted to shed heat (thermal energy) using whatever means is appropriate to the ambient conditions. To further enable cooling of the stationary chamber 418, one or more outside surfaces 17 of the stationary chamber 418 are optionally adapted to shed heat using appropriate means.

As the gas 50 cools, it will lose pressure, eventually allowing spring force in the diaphragm 32 to un-flex the diaphragm 32 downward to its at-rest position as illustrated in FIG. 4A, thereby reducing the volume of the enclosed volume 48, i.e., contracting the gas 50. By causing the generator capacitor plates 24a, 24b to be oppositely charged while the gas 50 is cooling, when the un-flexing diaphragm 32 moves the generator capacitor moving plate 24b away from the generator capacitor fixed plate 24a, this motion pulls against electrostatic force tending to mutually attract the oppositely charged generator capacitor plates 24a, 24b, and hence does work, which again generates energy in the form of electrical energy.

Thus it can be seen that a complete operational cycle for the stationary chamber heat engine/generator 410 is illustrated by the sequence of drawings in FIGS. 4A, then 4B, then 4C, then 4D, and finally back to 4A. Given the teaching of the present disclosure, variations of the described operational cycles may become apparent to one skilled in the relevant arts, and these variations are intended to be within the scope of the present invention. For example, timing of the charge applications to the stationary chamber motion capacitor 426 can be changed so that the gas 50 never contracts as much as is illustrated in FIG. 4A. Thus an alternate operational cycle for the stationary chamber heat engine/generator 410 is illustrated by the sequence of drawings in FIGS. 4B, then 4C, then 4D, and finally back to 4B.

The heat engine according to the present invention, illustrated in two embodiments 10 and 410, operates according to well-known principles of thermodynamics and electrostatics, and the integrated electrical generator also utilizes electrostatics, although other well-known techniques for converting linear oscillatory motion into electrical energy could also be used (e.g., charged wires moving through a magnetic field—i.e., electromagnetic devices; or piezoelectric devices). Likewise, in addition to the preferred electrostatic means of causing motion (utilizing the motion capacitor 26, 426), other well-known techniques for converting electrical energy into linear oscillatory motion could also be used (e.g., electromagnetic devices; or piezoelectric devices). A unique feature of the present invention is the utilization of a motive medium (e.g., gas 50) that is permanently contained in a single closed chamber (e.g., enclosed volume 48, 448) but is allowed to expand and contract (e.g., by means of the diaphragm 32). This contrasts with Stirling-type heat engines wherein the motive medium circulates between multiple chambers, e.g., between a first heated (expansion) chamber and a second cooling (regeneration) chamber.

In the preferred embodiments described hereinabove, the gas 50 is employed as the motive medium. As such, the principles of thermodynamics relevant to operation of the heat engine/generator 10, 410 can be simply expressed by the ideal gas law:

$$PV = nRT$$

where P is pressure, V is volume, n is number of molecules, R is a constant, and T is temperature for the gas 50 contained in the enclosed volume 48, 448. Since the enclosed volume 48, 448 is sealed, the number of molecules of gas 50 remains constant. Therefore, the ideal gas law can be further simplified to state that pressure P times volume V is proportional to temperature T for the gas 50. Thus, when the gas temperature T is raised by the input of heat energy, the gas pressure P will rise proportionally until the pressure P is enough to flex the diaphragm 32, thereby increasing the gas volume V as long as the diaphragm 32 continues to flex outward. This process is reversed when the net heat transfer is outward from the gas 50, thereby causing the gas temperature T to decrease.

Figure 5:
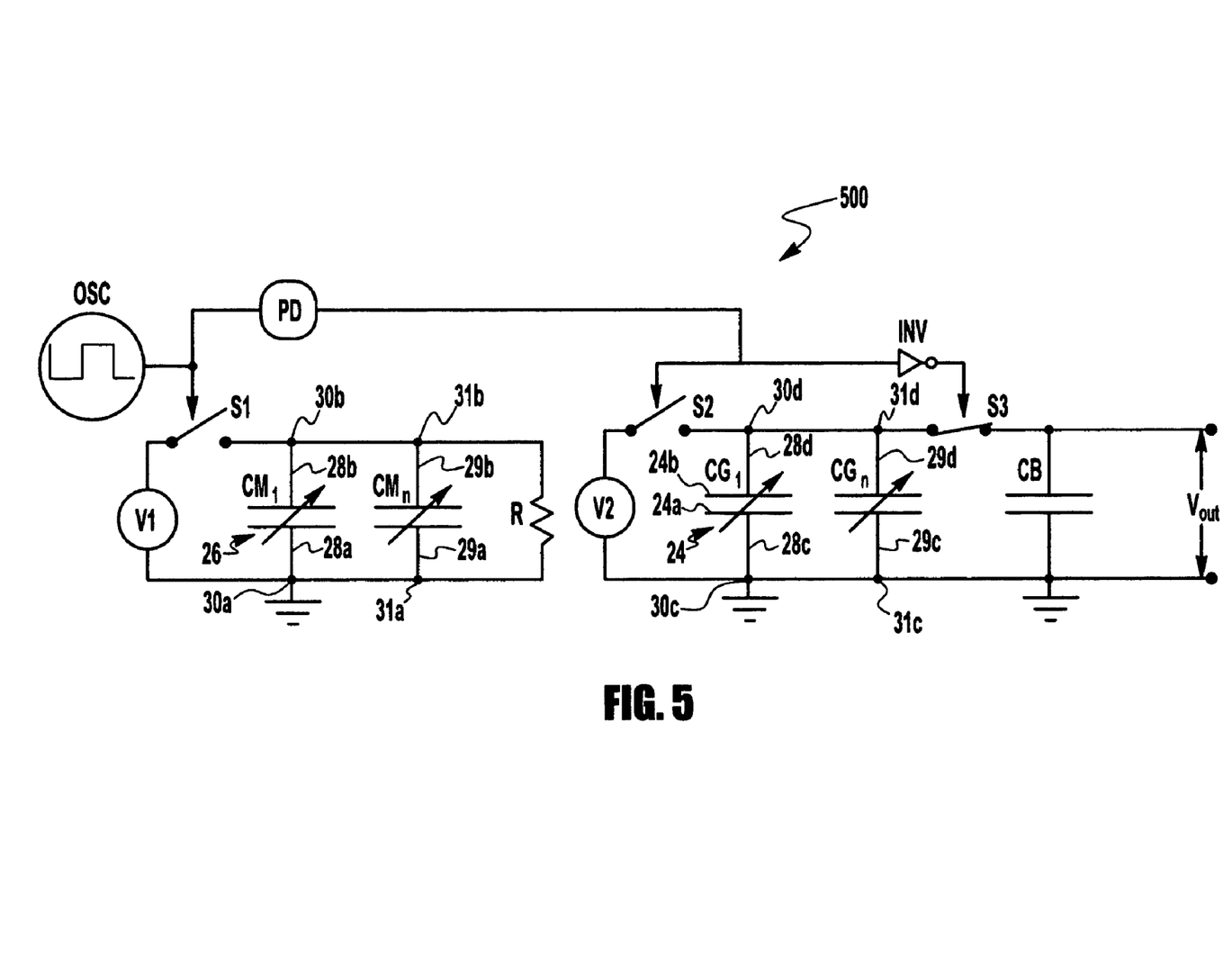
FIG. 5 is a schematic drawing of an enabling embodiment of an electrical generation and control system for employment with the heat engine/generators according to the invention.

With reference to FIGS. 1, 2A and 5, an enabling example of the electrical functioning of the preferred embodiment of heat engine/generator 10 will now be described. The following teachings can be easily applied to other embodiments, such as the stationary chamber heat engine/generator 410.

In general, by charging the generator capacitor plates 24a, 24b with like charges (e.g., both negative) when the gas 50 is expanding (thereby moving together the generator capacitor plates 24a, 24b against electrostatic repulsion), and with opposite charges (e.g., one negative, the other positive) when the gas is contracting (thereby moving apart the generator capacitor plates 24a, 24b against electrostatic attraction), the moving generator capacitor plates 24a, 24b produce electrical energy. The charging of the generator capacitor plates 24a, 24b can be done simply if one of the generator capacitor plates 24a, 24b is charged to a fixed voltage. With the generator capacitor movable plate 24b charged, for example, to a positive voltage, when the generator capacitor plates 24a, 24b move together negative charge will be attracted to the generator capacitor fixed plate 24a, and when they move apart, the negative charge will flow away from the generator capacitor fixed plate 24a. This flow of charge is an electrical current, which can be used as an energy source. Alternative methods of converting the motion of the diaphragm 32 into electrical energy could be by other means, including magnetic forces, or piezoelectric effects.

Many different known forms of electrical generation and control systems can be employed with the herein disclosed heat engine/generators 10, 410. FIG. 5 is a schematic drawing that illustrates a simple enabling embodiment of an electrical system 500. Referring also to FIG. 1, the motion capacitor 26 is connected by means of traces 28a, 28b to connection pads 30a, 30b, respectively. The motion capacitor 26 is generically labeled as "CM1", i.e., the motion capacitor of the first heat engine/generator 10a in an array comprising a quantity "n" of heat engine/generators 10. Thus, the last, or "$n^{th}$", of the heat engine/generators 10 (e.g., heat engine/generator 10b in FIG. 1, connected by means of traces 29a, 29b to connection pads 31a, 31b, respectively) has the $n^{th}$ motion capacitor labeled as "CMn". In the electrical system 500, the motion capacitors CM1, CMn (referred to collectively as motion capacitors CM) are connected in parallel, and are intended to represent all of the motion capacitors CM in the array of heat engine/generators 10.

Similarly, the generator capacitor 24 is connected by means of traces 28c, 28d to connection pads 30c, 30c, respectively. The generator capacitor 24 is generically labeled as "CG1", i.e., the motion capacitor of the first heat engine/generator 10a in an array comprising a quantity "n" of heat engine/generators 10. Thus, the last, or "$n^{th}$", of the heat engine/generators 10 (e.g., heat engine/generator 10b in FIG. 1, connected by means of traces 29c, 29d to connection pads 31c, 31d, respectively) has the $n^{th}$ motion capacitor labeled as "CMn". In the electrical system 500, the generator capacitors CG1, CGn (referred to collectively as generator capacitors CG) are connected in parallel, and are intended to represent all of the generator capacitors CG in the array of heat engine/generators 10.

An oscillator OSC opens and closes three switches: a motion control switch S1, a generator control switch S2, and an inverted generator control switch S3. A phase delay circuit PD causes an adjustable delay in the operation of the generator control switch S2, and the inverted generator control switch S3, compared to the operation of the motion control switch S1. An inverter (logical "not") INV is placed between the control line for the generator control switch S2 and the control line for the inverted generator control switch S3, for inverting the phase of the oscillator OSC signal. A resistor R is applied across the motion capacitors CM, and a motion voltage source V1 is periodically applied across the motion capacitors CM and the resistor R under control of the oscillator-signal-driven motion control switch S1. A generator voltage source V2 is periodically applied across the generator capacitors CG under control of the phase-delayed-oscillator-signal-driven generator control switch S2. An optional buffer capacitor CB is applied across a generator output Vout to smooth the power output. The generator capacitors CG are periodically connected to the generator output Vout under control of the phase-delayed-and-inverted-oscillator-signal-driven inverted generator control switch S3. One side of the circuit is referenced to ground.

In general, the oscillator OSC drives the motion control switch S1 to alternately charge and discharge the motion capacitor CM (e.g., 26), thus moving the chamber 18 into contact with and then away from the heat source HEAT in the base 12. The consequent expansion and contraction of the enclosed volume 48 varies the capacitance value of the generator capacitor CG (e.g., 24). The same oscillator OSC signal that drives the motion control switch S1 controlling the motion capacitor CM, also drives switches controlling the voltage input and output from the generator capacitor CG, however, with a delay introduced by the phase delay circuit PD. The delay accounts for the fact that it takes the motion capacitor CM a non-zero amount of time to move, and the motive medium (e.g., gas 50) takes a non-zero amount of time to heat up and begin to expand. The delay is expected to be between zero and a quarter wave (quarter of a signal period for the oscillator OSC). The delay approaches zero in the case where the time it takes the motion capacitor CM to move and the gas 50 to heat up is much smaller than the signal period, and approaches a quarter wave (one fourth of the signal period) in the case where the oscillation frequency is as fast as a thermal and mechanical time constant for the heat engine/generator 10.

When the generator control switch S2 is closed, the generator capacitor CG is charged to a voltage Vg by the generator voltage source V2. An amount of charge "q" thereby placed on the generator capacitor CG is given by:

$$q=C(Vg)$$

where a capacitance value C is given by:

$$C=A\epsilon/d$$

where A is the area of the generator capacitor CG plates (e.g., 24a, 24b), $\epsilon$ is a constant (the dielectric constant), and "d" is the distance (e.g., D1) between the plates of the generator capacitor CG. Thus, as the distance d decreases, the capacitance value C increases, and vice versa. When the capacitance C changes due to the motion of the system, at a given charge state $$V=q/C$$

Thus, as the plates of the generator capacitor CG are moved apart by the contracting gas 50, the distance d increases causing the capacitance C to decrease, which in turn causes the voltage V across the generator capacitor CG to increase. At this point, the generator control switch S2 is opened while the inverted generator control switch S3 is closed. This now connects the generator capacitor CG to the generator output Vout. Since the generator capacitor CG was charged to a voltage Vg, and is discharged into the output at a higher voltage, more energy is taken out of the generator capacitor CG at the generator output Vout than was input into the generator capacitor CG by the generator voltage source V2, hence, there is a net power output. The buffer capacitor CB optionally serves as a buffer to smooth the output power waveform.

The energy output from the electrical system 500 may take the form of an electrical current wherein the charge q on the plates of all the parallel-connected array generator capacitors CG1 to CGn (CG) is driven by the changing voltage V on the array generator capacitors CG. The more array generator capacitors CG there are in parallel, the more charge q will be driven, and therefore the higher the resulting current will be at the generator output Vout. Alternatively, the output voltage level can be increased by connecting array generator capacitors CG in series across the generator output Vout, using known electrical circuit design techniques.

Thus has been described a novel form of heat engine that is easily adapted for electrical power generation. The inventive heat engine/generator is particularly effective when implemented with micro-electromechanical system (MEMS) technologies, thereby meeting a long-perceived need for inexpensive, small-scale, electrical power generation by efficient conversion of heat from relatively low temperature and relatively small scale heat sources, e.g., waste heat from other processes. The herein disclosed embodiments are mechanically simple and maintenance free to promote reliable long-term operation. They will function in space vacuum and/or atmospheric ambient conditions, and do not require the complexities of prior art engine/generators with, for example, fluid control valves and complex moving parts subject to wear and breakdown.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A heat engine for converting thermal energy to mechanical work, the heat engine comprising:
    a chamber containing a motive medium;
    means for alternately enabling and disabling conductive transfer of thermal energy from a heat source to the motive medium; and
    at least one movable side of the chamber that moves in response to thermally-induced volumetric changes in the motive medium;
    wherein the chamber consists essentially of a single closed chamber;
    further comprising:
    means for positioning the chamber away from a base that faces the single closed chamber, wherein the base is a heat source;
    a motion capacitor having a chamber plate disposed on a bottom surface of the chamber, wherein the bottom surface is at least one heat transfer side of the chamber, and an opposed base plate disposed on a top surface of the base; and
    means for placing the chamber plate alternately into and out of contact with the opposed base plate, thereby alternately enabling and disabling the conductive transfer of thermal energy from the heat source to the motive medium.

2. The heat engine of claim 1, wherein:
    the at least one movable side is a diaphragm that flexes under control of the placing means.

3. The heat engine of claim 1, wherein:
    the at least one heat transfer side of the chamber and at least a surface of the heat source are matingly corrugated.

4. The heat engine of claim 1, wherein the placing means comprises:
    the motion capacitor and the chamber plate being mounted on the at least one heat transfer side of the single closed chamber; and
    the base plate being mounted on the heat source.

5. The heat engine of claim 1, further comprising:
    an electrically non-conductive and thermally low-emissivity coating on at least one of the base plate and the chamber plate of the motion capacitor.

6. The heat engine of claim 1, further comprising:
    a thermally low-emissivity coating on a surface of the base that faces the single closed chamber.

7. The heat engine of claim 1, further comprising:
    a thermally low-emissivity coating on a surface of the single closed chamber that faces the base.

8. The heat engine of claim 1, wherein:
    the at least one movable side is a diaphragm that flexes in response to thermally-induced volumetric changes in the motive medium.

9. The heat engine of claim 1, further comprising:
    electrical generation means that utilize the movement of the movable side.

10. The heat engine of claim 9, wherein the electrical generation means comprise:
    a generator capacitor having a moving plate on the movable side that moves relative to a fixed plate.

11. The heat engine of claim 10, wherein:
    the generator capacitor fixed plate is mounted on a structure that is adapted to shed heat.

12. The heat engine of claim 1, wherein:
    the heat engine is implemented with micro-electromechanical system (MEMS) technologies; and
    the heat engine comprises one or more individual heat engines implemented in an array.

13. The heat engine of claim 1, wherein:
    the motive medium is a gas.

14. The heat engine of claim 1, wherein:
    one or more surfaces of the single closed chamber are adapted to shed heat.

15. The heat engine of claim 1, wherein:
    the single closed chamber is supported by at least one arm that bends.

16. The heat engine of claim 15, wherein:
    the single closed chamber is supported by two arms on opposed sides of the chamber.

17. The heat engine of claim 1, wherein:
    the single closed chamber is supported above a base by a set of chamber standoffs.

18. The heat engine of claim 17, wherein:
    the chamber standoffs are disposed one in each corner of a chamber bottom surface.

19. The heat engine of claim 1, further comprising:
    a motion capacitor formed between a bottom of the single closed chamber and a base; and
    a generator capacitor formed between a top surface of the single closed chamber and a cap.

20. The heat engine of claim 19, wherein:
    wherein the at least one movable side comprises the top surface.

21. The heat engine of claim 20, wherein:
    wherein the at least one movable side comprises the bottom surface.

22. A method for converting heat into linear oscillatory motion, the method comprising the steps of:

containing a motive medium in a structure comprising a chamber having at least one movable side that moves in response to thermally-induced volumetric changes in the motive medium; and alternately enabling and disabling conductive transfer of thermal energy from a heat source to the motive medium;

wherein the chamber consists essentially of a single closed chamber;

further comprising:

positioning the chamber away from a base that faces the single closed chamber, wherein the base is a heat source;

disposing a motion capacitor having a chamber plate on a bottom surface of the chamber, wherein the bottom surface is at least one heat transfer side of the chamber, and an opposed base plate disposed on a top surface of the base; and placing the chamber plate alternately into and out of contact with the opposed base plate, thereby alternately enabling and disabling the conductive transfer of thermal energy from the heat source to the motive medium.

23. The method of claim 15, further comprising the step of:

placing at least one heat transfer side of the single closed chamber by flexing the at least one heat transfer side as a diaphragm.

24. The method of claim 15, further comprising the step of:

enhancing heat transfer by matingly corrugating the at least one heat transfer side and at least a surface of the heat source.

25. The method of claim 15, further comprising the step of:

utilizing a placing means comprising:

the motion capacitor, and the chamber plate being mounted on the at least one heat transfer side of the single closed chamber; and the base plate being mounted on the heat source.

26. The method of claim 15, further comprising the step of:

using a gas for the motive medium.

* * * * *